United States Patent Office.

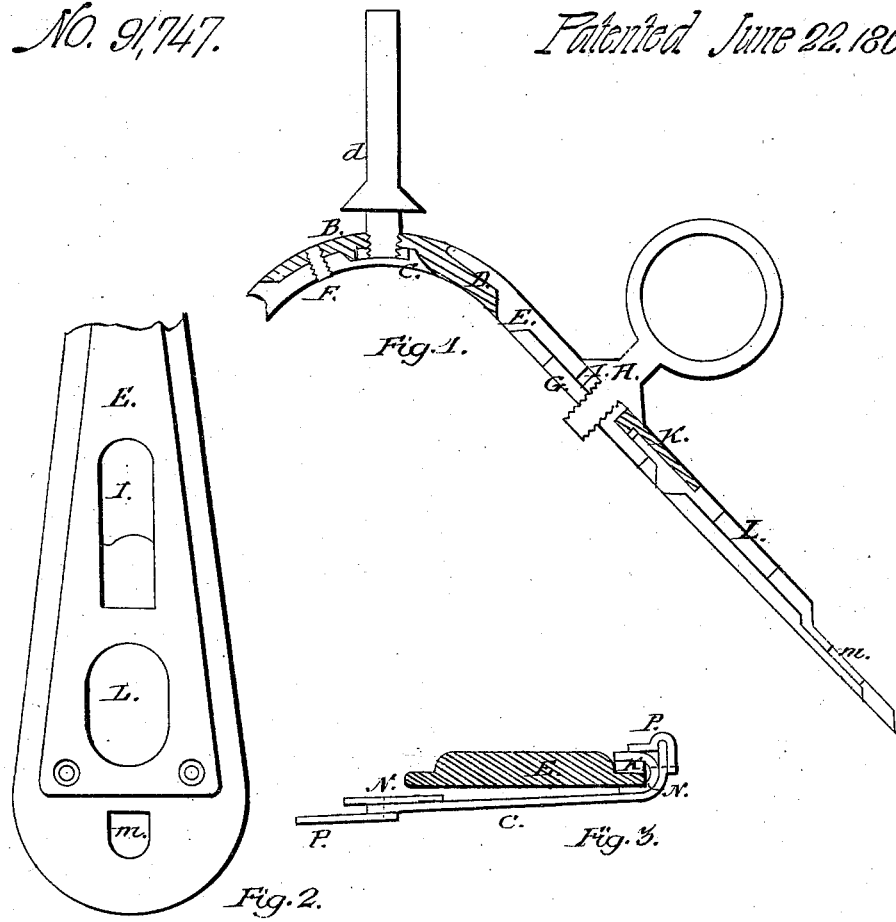

JOHN HUGHES, OF NEWARK, NEW JERSEY.

Letters Patent No. 91,747, dated June 22, 1869.

IMPROVED HARNESS-PAD.

The Schedule referred to in these Letters Patent and making part of the same.

*To all whom it may concern:*

Be it known that I, JOHN HUGHES, of Newark, in the county of Essex, and State of New Jersey, have invented a new and improved Harness-Pad; and I do hereby declare that the following is a full and exact description of the same, reference being had to the accompanying drawings, and to the letters of reference marked thereon.

First, my invention consists in an adjustable strip, B, which is slipped on to the square shank of the hook A, Figure 1, and then of turning a nut, C, on the end of the hook, on the lower side of the said strip.

The end, D, of the strip, is passed through the plate E, and the strip made to rest in a groove on the top of the plate, and held in its place by the screw F.

The objects are to attach the hook to an adjunct of the plate first, and also to prevent the hook turning in the plate.

I am aware that the same results have been secured before, but by a different device from this.

The second provision of this invention is of one or more apertures in the lower end of the plate, through which the nut G, for the terret H, may be slipped to its place, after the pad is made up.

These apertures are shown particularly in Figure 2.

I is an aperture for the terret, and is or may be large enough for the nut to be slipped through, and then the excess of the aperture, more than is needed for the shank of the terret, is covered with the small plate K, fig. 1.

L is an aperture below the other, and allows the nut to be slipped through the plate, and then worked up to the place for the terret.

The nut, for the screw to be put through the opening m, may also be put through the apertures L, and slipped down to its place, to receive the screw.

This part of the invention is of especial importance in putting these nuts in place after the pad is made up, and also as there is often need of putting in a new nut.

The third item of improvement is in stitching a welt, N, to the leather, O, which leather forms the lower side of the pad.

This welt accomplishes a protection of the leather, when it passes over the edge of the frame or plate E, Figure 3, and also gives increased strength to the whole, the edge of it being turned over, and, with the binding P, tacked on to the strip R.

This strip and binding are parts of my former patent. The welt is new.

The whole together makes a valuable improvement in a pad.

I claim—

1. The plate B, formed with an aperture for the passage of the shank of hook $a$, and having an extension, D, which enters a recess in plate E, whereby, in connection with screw F and nut $e$, the hook $a$ is secured to the plate B, and the latter is secured to plate E, substantially as and for the purpose herein set forth.

2. The construction of plate E, with depressions in its upper and under sides, for the reception of the plate B and nut G, and the provision of apertures L L in said plate E, substantially as and for the purpose herein set forth.

3. The removable plate K, constructed and arranged substantially as and for the purpose herein set forth and shown.

JOHN HUGHES.

Witnesses:
HORACE HARRIS,
C. E. MARSH.